（12）United States Patent
Shou et al.

(10) Patent No.: US 11,629,948 B2
(45) Date of Patent: Apr. 18, 2023

(54) OPTICAL INTERFEROMETRY PROXIMITY SENSOR WITH OPTICAL PATH EXTENDER

(71) Applicant: Apple Inc., Cupertino, CA (US)

(72) Inventors: Nathan Shou, San Francisco, CA (US); Daryl I. Vulis, San Francisco, CA (US); Tong Chen, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/167,218

(22) Filed: Feb. 4, 2021

(65) Prior Publication Data

US 2022/0244041 A1    Aug. 4, 2022

(51) Int. Cl.
*G01B 11/14*      (2006.01)
*G01B 9/02015*    (2022.01)
*G01B 9/02*       (2022.01)

(52) U.S. Cl.
CPC .......... *G01B 11/14* (2013.01); *G01B 9/02015* (2013.01); *G01B 9/02054* (2013.01)

(58) Field of Classification Search
CPC . G01B 11/14; G01B 9/02015; G01B 9/02054
See application file for complete search history.

(56) References Cited

U.S. PATENT DOCUMENTS

| | | | |
|---|---|---|---|
| 4,254,333 A | 3/1981 | Bergström | |
| 4,468,131 A | 8/1984 | Bui et al. | |
| 4,913,547 A | 4/1990 | Moran | |
| 5,781,297 A | 7/1998 | Castore | |
| 5,825,465 A | 10/1998 | Nerin et al. | |
| 6,233,045 B1 | 5/2001 | Suni et al. | |
| 6,816,523 B1 | 11/2004 | Glenn et al. | |
| 6,872,931 B2 | 3/2005 | Liess et al. | |
| 7,139,446 B2 | 11/2006 | Slotwinski | |
| 7,277,180 B2 | 10/2007 | Townley-Smith et al. | |

(Continued)

FOREIGN PATENT DOCUMENTS

| | | |
|---|---|---|
| CN | 101592762 | 12/2009 |
| CN | 102109650 | 6/2011 |

(Continued)

OTHER PUBLICATIONS

U.S. Appl. No. 11/156,456 filed Oct. 2021, Chen et al.

(Continued)

*Primary Examiner* — Hwa Andrew Lee
(74) *Attorney, Agent, or Firm* — Brownstein Hyatt Farber Schreck, LLP

(57) ABSTRACT

An optical proximity sensor includes an optical path extender that extends an optical path length of the optical proximity sensor without a corresponding extension of a geometric path length of the optical proximity sensor. The optical path extender may be a high-refractive index material positioned along the optical path through the optical proximity sensor. The optical path extender may include one or more redirection features configured to change a direction of the light traveling within the optical proximity sensor. The optical path extender may include a photonic component configured to simulate an extension of the geometric path within an optical proximity sensor by applying a momentum-dependent transfer function to the light traveling through it.

19 Claims, 9 Drawing Sheets

(56) References Cited

U.S. PATENT DOCUMENTS

| | | | |
|---|---|---|---|
| 7,336,368 B2 | 2/2008 | Liao et al. |
| 7,388,672 B2 | 6/2008 | Zhou et al. |
| 7,509,050 B2 | 3/2009 | Ekkizogloy et al. |
| 7,589,709 B2 | 9/2009 | Liess et al. |
| 7,620,332 B2 | 11/2009 | Nishiyama |
| 7,667,851 B2 | 2/2010 | Dubois et al. |
| 7,675,020 B2 | 3/2010 | Machida |
| 7,995,193 B2 | 8/2011 | Kuwata |
| 8,208,814 B2 | 6/2012 | Sheth et al. |
| 8,248,615 B2 | 8/2012 | Ueno |
| 8,416,424 B2 | 4/2013 | Werner et al. |
| 8,446,592 B1 | 5/2013 | Arissian |
| 8,529,460 B2 | 9/2013 | Kawano et al. |
| 8,736,581 B2 | 5/2014 | Han et al. |
| 8,751,091 B2 | 6/2014 | Moench et al. |
| 8,781,687 B2 | 7/2014 | Han et al. |
| 8,896,745 B2 | 11/2014 | Takachi |
| 8,942,069 B2 | 1/2015 | Tortora |
| 9,004,698 B2 | 4/2015 | Kilcher et al. |
| 9,091,573 B2 | 7/2015 | Van Der Lee et al. |
| 9,091,747 B2 | 7/2015 | Pruijmboom |
| 9,146,304 B2 | 9/2015 | Land et al. |
| 9,160,390 B2 | 10/2015 | Zhou et al. |
| 9,459,352 B2 | 10/2016 | Becker et al. |
| 9,648,221 B2 | 5/2017 | Seo et al. |
| 9,658,113 B2 | 5/2017 | Bosch et al. |
| 9,726,474 B2 | 8/2017 | Royo Royo et al. |
| 9,772,398 B2 | 9/2017 | Bikumandla et al. |
| 9,778,037 B2 | 10/2017 | Bestler |
| 9,911,890 B2 | 3/2018 | Renard et al. |
| 9,912,923 B2 | 3/2018 | Kilcher et al. |
| 9,952,245 B2 | 4/2018 | Ueno |
| 9,995,877 B2 | 6/2018 | Nakamura |
| 10,184,783 B2 | 1/2019 | Flanders et al. |
| 10,215,555 B2 | 2/2019 | Chen et al. |
| 10,222,474 B1 | 3/2019 | Raring et al. |
| 10,317,651 B2 | 6/2019 | Furutake et al. |
| 10,379,028 B2 | 8/2019 | Spruit et al. |
| 10,386,554 B2 | 8/2019 | Hjelmstrom et al. |
| 10,492,679 B2 | 12/2019 | Zhou |
| 10,503,048 B2 | 12/2019 | Del Bino et al. |
| 10,555,079 B2 | 2/2020 | Bakish |
| 10,613,625 B2 | 4/2020 | Huang et al. |
| 10,614,295 B2 | 4/2020 | Kim et al. |
| 10,635,800 B2 | 4/2020 | Bakish |
| 10,581,474 B1 | 6/2020 | Fishman et al. |
| 10,705,211 B2 | 7/2020 | Jacobs et al. |
| 10,718,922 B2 | 7/2020 | Yong et al. |
| 10,791,283 B2 | 9/2020 | Bardagjy et al. |
| 10,824,275 B2 | 11/2020 | Mutlu et al. |
| 10,845,873 B2 | 11/2020 | Huang |
| 10,866,083 B2 | 12/2020 | Van Der Lee et al. |
| 10,871,820 B2 | 12/2020 | Mutlu et al. |
| 10,871,836 B2 * | 12/2020 | Dashevsky ............. G04G 21/08 |
| 11,073,615 B2 | 7/2021 | Chua et al. |
| 11,112,233 B2 | 9/2021 | Mutlu et al. |
| 11,150,332 B1 | 10/2021 | Chen et al. |
| 11,157,113 B2 | 10/2021 | Winkler et al. |
| 11,243,068 B1 | 2/2022 | Mutlu et al. |
| 11,243,686 B2 | 2/2022 | McCord |
| 11,280,714 B2 | 3/2022 | Momtahan et al. |
| 11,460,293 B2 | 10/2022 | Chen et al. |
| 2005/0156874 A1 | 7/2005 | Kong |
| 2005/0157971 A1 | 7/2005 | Juijve |
| 2006/0239312 A1 | 10/2006 | Kewitsch et al. |
| 2007/0002013 A1 * | 1/2007 | Kong ................... G01S 7/4916 345/157 |
| 2008/0123106 A1 | 5/2008 | Zeng et al. |
| 2009/0002829 A1 | 1/2009 | Shinohara |
| 2010/0187449 A1 * | 7/2010 | Schemmann ......... G06F 3/0317 250/552 |
| 2011/0126617 A1 | 6/2011 | Bengoechea Apezteguia et al. |
| 2011/0267467 A1 | 11/2011 | Kimura et al. |
| 2012/0281221 A1 | 11/2012 | Studer et al. |
| 2014/0293055 A1 | 10/2014 | Otsuka |
| 2015/0309568 A1 | 10/2015 | Miki |
| 2016/0021285 A1 | 1/2016 | Nadler et al. |
| 2017/0090599 A1 | 3/2017 | Kuboyama et al. |
| 2017/0192133 A1 | 7/2017 | Murakami et al. |
| 2017/0343817 A1 | 11/2017 | Bietry et al. |
| 2017/0374261 A1 | 12/2017 | Teich et al. |
| 2018/0073924 A1 | 3/2018 | Steinmann et al. |
| 2018/0081434 A1 | 3/2018 | Siddiqui et al. |
| 2019/0146065 A1 * | 5/2019 | Jutte ...................... G01S 17/58 356/4.01 |
| 2019/0317454 A1 | 10/2019 | Holenarsipur et al. |
| 2019/0319157 A1 | 10/2019 | Coffy et al. |
| 2019/0391539 A1 | 12/2019 | Perkins et al. |
| 2020/0072740 A1 | 3/2020 | Venturini et al. |
| 2020/0103274 A1 | 4/2020 | Garrett et al. |
| 2020/0200522 A1 | 6/2020 | Huang et al. |
| 2020/0309661 A1 | 10/2020 | Spruit et al. |
| 2020/0370879 A1 | 11/2020 | Mutlu et al. |
| 2021/0003385 A1 | 1/2021 | Tan et al. |
| 2021/0011559 A1 | 1/2021 | Mutlu et al. |
| 2021/0015350 A1 | 1/2021 | Butte et al. |
| 2021/0104873 A1 * | 4/2021 | Gerlach ............. G01B 9/02092 |
| 2021/0116355 A1 | 4/2021 | Spruit et al. |
| 2021/0294489 A1 | 9/2021 | Li et al. |
| 2022/0003543 A1 | 1/2022 | Chen et al. |
| 2022/0155052 A1 | 5/2022 | Mutlu et al. |

FOREIGN PATENT DOCUMENTS

| | | |
|---|---|---|
| CN | 105223579 | 1/2016 |
| CN | 107564924 | 1/2018 |
| CN | 108225543 | 6/2018 |
| CN | 108692663 | 4/2020 |
| EP | 3796140 | 3/2021 |
| JP | 2005528682 | 9/2005 |
| JP | 2010526315 | 7/2010 |
| JP | 2011523700 | 8/2011 |
| JP | 2013508717 | 3/2013 |
| JP | 2019515258 | 6/2019 |
| JP | 2019121691 | 7/2019 |
| WO | WO 05/013517 | 2/2005 |
| WO | WO 09/156937 | 12/2009 |
| WO | WO 10/139144 | 12/2010 |
| WO | WO 12/049561 | 4/2012 |
| WO | WO 17/178711 | 10/2017 |
| WO | WO 18/036685 | 3/2018 |
| WO | WO 19/015623 | 1/2019 |
| WO | WO 19/042953 | 3/2019 |

OTHER PUBLICATIONS

U.S. Appl. No. 16/418,875, filed May 21, 2019, Chen et al.
U.S. Appl. No. 16/773,827, filed Jan. 27, 2020, Mutlu et al.
U.S. Appl. No. 16/827,646, filed Mar. 23, 2020, Li et al.
U.S. Appl. No. 16/917,891, filed Jun. 30, 2020, Chen et al.
U.S. Appl. No. 17/124,132, filed Dec. 16, 2020, Chen et al.
U.S. Appl. No. 17/710,682, filed Mar. 31, 2022, Chen et al.
U.S. Appl. No. 17/894,571, filed Aug. 24, 2022, Mutlu et al.
U.S. Appl. No. 17/903,840, filed Sep. 6, 2022, Chen et al.
Diao et al., "High-speed high-resolution heterodyne interferometer using a laser with low beat frequency," *Applied Optics*, vol. 55, No. 1, 2015, pp. 110-116.

* cited by examiner

OPTICAL INTERFEROMETRY PROXIMITY SENSOR WITH OPTICAL PATH EXTENDER

FIELD

Embodiments described herein relate to optical sensors, and, in particular, to optical interferometry proximity sensors configured to determine a distance to, and/or velocity of, an object.

BACKGROUND

An electronic device can include a system or sensor—referred to herein as a "proximity sensor"—to measure or estimate a distance separating that electronic device in free space from an object or surface, such as a user of the electronic device. However, conventional proximity sensors may require free space along an optical path to achieve satisfactory sensing performance, which contributes to an increased thickness of the proximity sensors and the devices in which they are deployed.

SUMMARY

Embodiments described herein reference an optical proximity sensor that includes an optical path extender. The optical path extender may be positioned between a light source and an aperture in a housing of the optical proximity sensor. The light source is configured to illuminate an object and collect a retroreflective signal to determine a distance to and/or a velocity of that object based on self-mixing interferometry. The optical path extender may increase an optical path length of the optical proximity sensor, thereby allowing the optical proximity sensor to have a reduced thickness compared to traditional optical proximity sensors while achieving similar or improved sensing performance.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
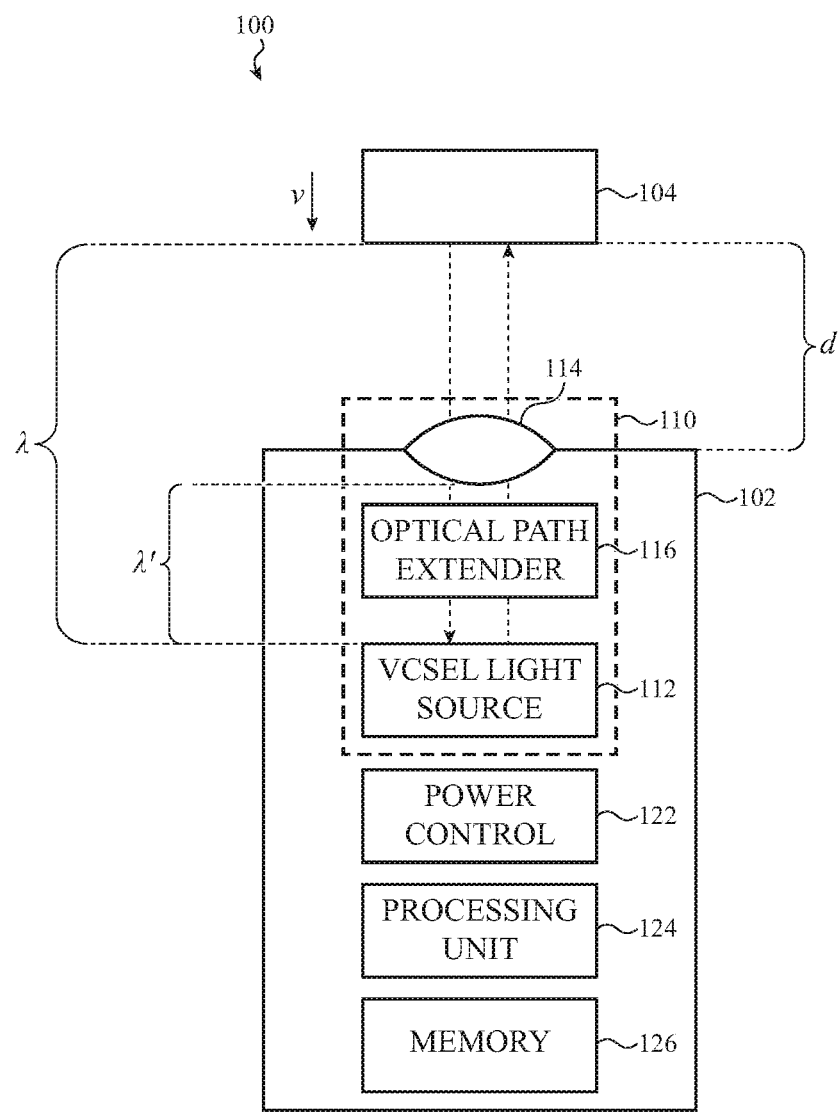
FIG. 1 depicts a schematic representation of an electronic device incorporating a proximity sensor, such as described herein, to determine a distance to, and/or a velocity of, an object near the electronic device.

The use of cross-hatching or shading in the accompanying figures is generally provided to clarify the boundaries between adjacent elements and to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths -which may include reflections, refractions, diffractions, and so on, through one or more mediums -that may be taken by one or more photons originating from one or more light sources shown or, or in some cases, omitted from, the accompanying figures. It is understood that these simplified visual representations of light are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to an optical proximity sensor for an electronic device. These embodiments typically include a vertical cavity surface-emitting laser ("VCSEL") oriented to radiate a beam of light toward an object near the optical proximity sensor in order to determine a distance to that object and/or a velocity of that object relative to the optical proximity sensor. A distance to the object and/or a velocity of the object can be determined based on a reflection of the radiated beam from an external surface of the object. The object can be internal to, or external to, the electronic device incorporating the optical proximity sensor. The beam of light may have a wavelength modulated according to a particular pattern, referred to herein as "wavelength modulation."

The optical proximity sensor can include one or more optical path extenders to reduce a thickness of the optical proximity sensor by extending an optical path length of the optical proximity sensor. As a result, the optical proximity sensor may occupy less space in an electronic device, and/or the optical proximity sensor may be placed in smaller, thinner devices than traditional optical proximity sensors.

The optical path extender may extend the optical path length of the optical proximity sensor in any of a variety of ways. In some cases, the optical path extender may be a high-refractive index material positioned along the optical path through the optical proximity sensor. In some cases, the optical path extender may be integrated with a VCSEL light source, for example as a substrate of the VCSEL light source, as discussed in more detail with respect to FIG. 2.

Figure 3A:
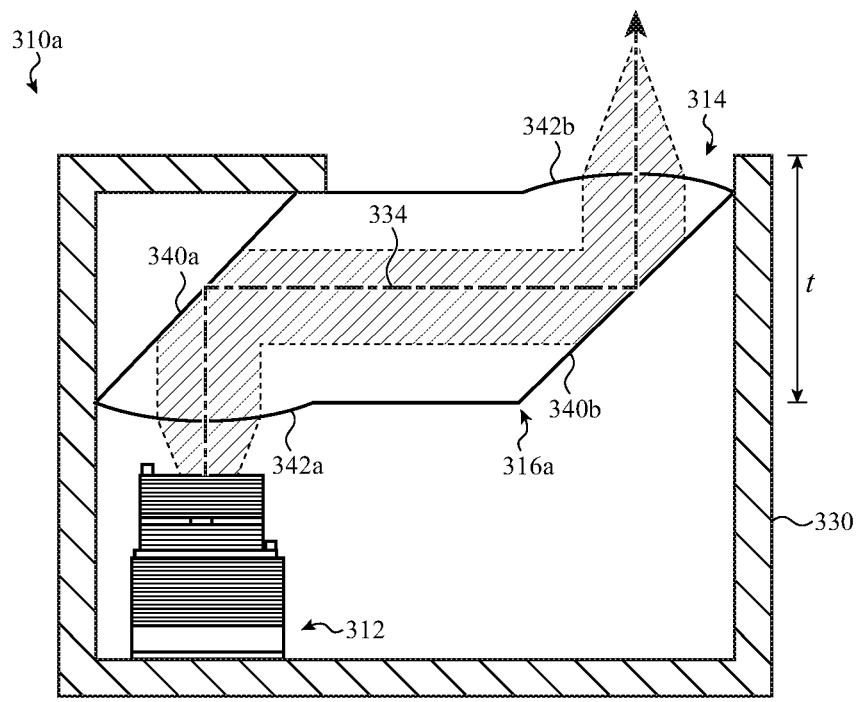
FIGS. 3A-3B illustrate example optical proximity sensors, which include redirection features to increase an optical path length of the optical proximity sensors.
Figure 3B:
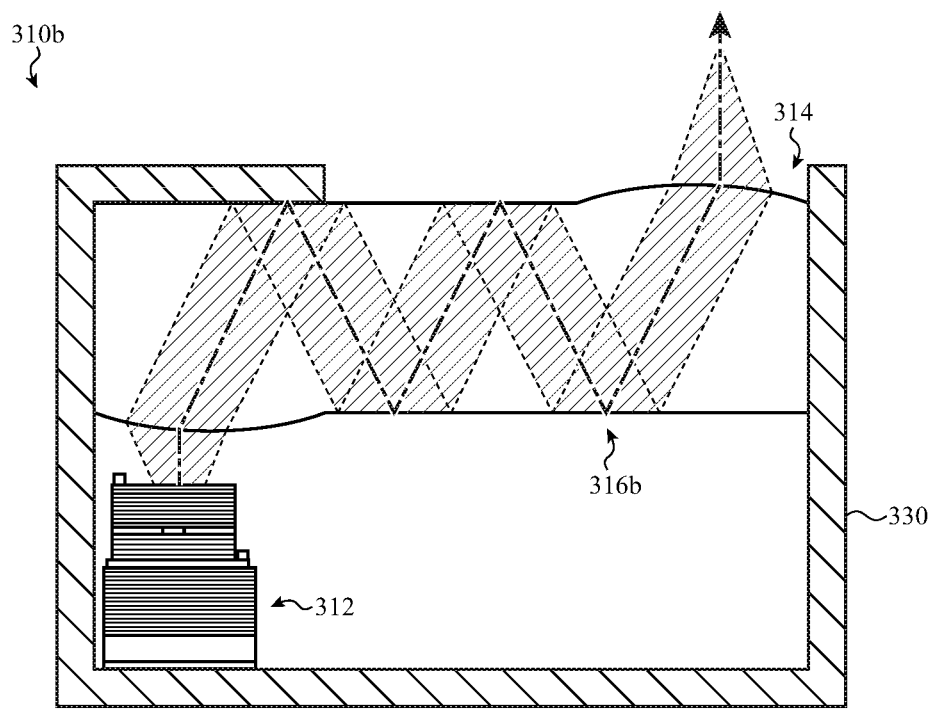

The optical path extender may include one or more redirection features configured to change a direction of the light traveling between the VCSEL light source and the window, as discussed in more detail with respect to FIGS. 3A-3B. Additionally or alternatively, the optical path extender may include a photonic component configured to simulate an extension of the geometric path within an optical proximity sensor by applying a momentum-dependent transfer function to the light traveling through it, as discussed in more detail with respect to FIGS. 4A-4B.

For simplicity of description, example embodiments are understood to reference a VCSEL configured to emit light in a spectral range that includes a non-visible frequency band (e.g., infrared or ultraviolet light). However, it may be appreciated that this is merely one example and that in other embodiments, more than one VCSEL can be used (e.g., an array of VCSELs disposed in any suitable pattern) or, additionally or alternatively, one or more VCSELs configured to emit light in a spectral range including a visible frequency band can be used. Further, although not required for all embodiments, the example VCSEL described in reference to many embodiments that follow is understood to be a Class 1 laser while operating in an opto-electronic module or system as defined by the American National Standards Association; in other cases, higher power lasers may be used. Additionally or alternatively, the embodiments described herein may include other lasers (e.g., edge emitting lasers (EEL), vertical external-cavity surface-emitting lasers (VECSEL), horizontal cavity surface-emitting lasers (HCSEL), quantum cascade lasers (QCL), solid state lasers, fiber lasers, etc.) and/or quasi-coherent and non-coherent light sources (e.g., light-emitting diodes (LED), RC-LED, super-luminescent diodes (SLD), etc.).

As noted above, a beam emitted from a VCSEL of an optical proximity sensor may be reflected from an object. At least a portion of the reflected light can be directed back into the VCSEL to return to (i.e., reenter) a quantum well layer of the VCSEL, interfering with the operation thereof and changing an electrical property of the VCSEL. the change in the electrical and/or optical property of the VCSEL is related to (1) the distance from the optical proximity sensor to the surface of the object and (2) the wavelength of light emitted by the VCSEL.

It may be appreciated that, because the wavelength of light emitted by the VCSEL-whether modulated or fixed -is known, any measured interference (also referred to as "self-mixing" effects) can be correlated to the relative displacement separating the surface of the object and the optical proximity sensor, for example by counting interference mode hops or by quantifying a property of a beat frequency (e.g., via frequency domain analysis). This relative displacement can be further correlated to an absolute distance separating the surface of the object and the optical proximity sensor. This distance is referred to herein as the "measured distance" separating the optical proximity sensor and the surface of the object. As may be appreciated, this construction leverages an effect typically referred to as "self-mixing" interferometry or reflectometry.

These foregoing and other embodiments are discussed below with reference to FIGS. 1-8. However, those skilled in the art will readily appreciate that the detailed description given herein with respect to these figures is for explanatory purposes only and should not be construed as limiting.

FIG. 1 depicts a schematic representation 100 of an electronic device 102 configured to measure a distance d to an object 104 and/or a velocity v of the object 104 along the line-of-sight axis relative to an optical proximity sensor 110 disposed within a housing of the electronic device 102. The electronic device may include a power controller 122, a processing unit 124, and a memory 126. In some cases, the power controller 122, the processing unit 124, and/or the memory 126 are included as part of the optical proximity sensor 110. In other cases, the power controller 122, the processing unit 124, and/or the memory 126 are separate components of the electronic device 102.

The optical proximity sensor 110 can include one or more VCSEL light sources 112, a window 114, and one or more optical path extenders 116. Broadly, the optical proximity sensor 110 can be used to determine a distance d to and/or a velocity v of the object 104. The optical path extender(s) 116 may reduce a thickness of the optical proximity sensor 110 by extending an optical path length beyond an apparent optical thickness of the optical proximity sensor. As a result, the optical proximity sensor 110 occupies less space in the electronic device 102, and/or the optical proximity sensor may be placed in smaller, thinner devices than traditional optical proximity sensors while achieving similar or improved sensing performance. Example optical path extenders are discussed in more detail with respect to FIGS. 2-4B.

The power controller 122 is coupled to the VCSEL light source 112. Each of these components—along with other components of the optical proximity sensor 110 that may be required or preferred in particular embodiments or implementations—can be disposed in whole or in part within a component enclosure. The optical proximity sensor 110 also includes a window 114 configured to allow light emitted from the VCSEL light source 112 to pass through the component enclosure to illuminate a surface of the object 104. In the illustrated embodiment, the VCSEL light source 112 is aligned with the window 114 such that light emitted from the VCSEL light source 112 traverses the window 114 and illuminates a surface of the object 104 (which may be a user, an internal surface of an electronic device, and so on).

In these examples, the processing unit 124 can be configured to cause the power controller 122 to generate a triangular current waveform (or other suitable periodic or non-periodic waveform) to inject current into VCSEL light source 112. For simplicity, the operation of injecting current, whether modulated or otherwise, into a VCSEL light source to emit light and to promoting self-mixing, whether by a power controller or processing unit such as described herein, is referred to herein as "driving" a light source.

Reflections from the object 104 traverse the window 114 and reenter the VCSEL light source 112 to cause self-mixing interference that is directly related to the distance d. In some cases, the power controller 122 can be further configured to monitor power output from one or more photodiodes optically coupled to the VCSEL light source 112 in order to quantify and/or otherwise determine variations in power output of the VCSEL light source 112 that result from the self-mixing effects (see, e.g., Equations 2 and 3 below).

The optical proximity sensor 110 may have a geometric path length l that extends between the VCSEL light source 112 and the target 104. The optical proximity sensor 110 may have an associated optical path length (OPL), which is equal to the product of the geometric path length l and the refractive index of the optical proximity sensor 110. The refractive index may vary along the geometric path length l of the optical proximity sensor 110, in which case the optical path length may be expressed by Equation 1 as follows:

$$OPL = \int_c n \, ds \qquad \text{Equation 1}$$

where n is the local refractive index as a function of distance along the geometric path C.

The optical path length is proportional to the time (i.e., time-of-flight) it takes light to traverse the geometric path of the optical proximity sensor 110. As noted above, the optical path extender 116 may extend the optical path length of the optical proximity sensor 110 without a corresponding extension of the geometric path length l by increasing the refractive index along the portion of the geometric path between the VCSEL light source 112 and the window 114 (indicated as l' in FIG. 1).

The optical path extender 116 may extend the optical path length of the optical proximity sensor 110 in any of a variety of ways. In some cases, the optical path extender 116 may be a high-refractive index material positioned between the VCSEL light source 112 and the window 114. In some cases, the optical path extender 116 may be integrated with the window 114. In some cases, the optical path extender 116 may be integrated with the VCSEL light source 112, for example as a substrate of a bottom-emitting (flip chip) VCSEL light source, as discussed in more detail with respect to FIG. 2.

The optical path extender 116 may include one or more redirection features configured to change a direction of the light traveling between the VCSEL light source 112 and the window 114 to create a folded path, as discussed in more detail with respect to FIGS. 3A-3B. Additionally or alternatively, the optical path extender 116 may include a photonic component configured to simulate an extension of the geometric path within the optical proximity sensor by applying a momentum-dependent transfer function to the light traveling through it, as discussed in more detail with respect to FIGS. 4A and 4B.

As noted above, the optical proximity sensor 110 can be used to determine a distance d to and/or a velocity v of the object 104. For example, in one embodiment, wavelength modulation may be used by the optical proximity sensor 110 to simultaneously detect distance d to, and velocity v of, the object 104 relative to the optical proximity sensor 110. Wavelength modulation can be achieved by modulating a drive current supplied to the VCSEL light source 112.

One example wavelength modulation leverages a triangular waveform including an "up cycle" (in which current supplied to the VCSEL light source 112 and, correspondingly, wavelength of the radiated beam emitted therefrom increase linearly at a particular rate) and a "down cycle" (in which current supplied to the VCSEL light source 112 and wavelength of the radiated beam emitted therefrom decrease linearly at the same particular rate). In this example, the undulation in wavelength can effectively simulate motion of the object 104 toward and away from the optical proximity sensor 110, whether or not that object 104 is actually moving. In these examples, frequency content of power output from the VCSEL light source 112—affected by self-mixing interference effects—can be described by Equation 2, presented below.

More specifically, in Equation 2 (below), the quantity $f_t$ denotes a frequency at which power output from the VCSEL light source 112 of the optical proximity sensor 110 is modulated as a result of self-mixing at a particular time t when the VCSEL light source 112 of the optical proximity sensor 110 is emitting light at a wavelength λ. The quantity $f_t$ may denote a baseband frequency or intermediate frequency (IF), which is typically several orders of magnitude lower than the optical carrier frequency (wavelength) and its modulation, and is readily sampled by radio frequency electronics.

It may be appreciated that as the absolute distance d to the object changes (which is equal to half of the total round-trip distance, $d_{rt}$), light received by the VCSEL light source 112 at time t will have a different wavelength than the light emitted by the VCSEL light source 112 at the same time t because the wavelengths of the two beams differ by an amount related to the rate of change over time in wavelength $$\frac{d\lambda}{dt}$$

multiplied by the total round-trip flight time required for the previously-emitted light to traverse the round-trip distance $d_{rt}$ from the VCSEL light source 112 to the object and back.

In this manner, power output from the VCSEL light source 112 follows the triangular waveform (e.g., a current injected into the VCSEL light source 112 at a rate of $$\frac{dI}{dt}).$$

In addition, power output from the VCSEL light source 112 has an interference signal superimposed upon that triangular waveform that corresponds to the effects of constructive or destructive interference that results from different wavelengths of light interfering with one another in specific ways.

More specifically, the superimposed interference corresponds to the number of constructive and destructive interference "mode" transitions (e.g., also referred to as a beat frequency) that occur between two specific wavelengths of light that are determined based on the absolute distance to—or, more specifically, the round-trip time required to travel to and from—the object and based on the rate of change in wavelength $$\frac{d\lambda}{dt}$$

which, in turn, is based on the rate of change in current injected into the VCSEL light source $$112\frac{dI}{dt}.$$

Phrased in another manner, a wavelength of light emitted from the VCSEL light source 112 at time $t_0$ is different from a wavelength of light emitted from the VCSEL light source 112 at time $t_1$ by an amount determined by the rate of change in wavelength $$\frac{d\lambda}{dt}.$$

In this manner, because different wavelengths of light are emitted at different times (based on the rate of change $$\frac{d\lambda}{dt}),$$

different wavelengths of light will be received at within the VCSEL light source 112 based on the time at which that particular wavelength was emitted.

As such, generally and broadly, it may be appreciated that the frequency content of the power output from the VCSEL light source 112 (e.g., quantity $f_t$) is directly related to the OPL separating the VCSEL light source 112 and the object 104.

Further, it may be appreciated that, quantity $f_t$ may increase or decrease as a result of one or more Doppler effects resulting from the velocity v of the object 104. For example, if the object 104 is moving toward the optical proximity sensor (e.g., parallel to the direction of propagation of the emitted beam), the frequency $f_t$ may increase. Alternatively, if the object 104 is moving away from the optical proximity sensor (e.g., parallel to the direction of propagation of the emitted beam), the frequency $f_t$ may decrease.

Equation 2, relating the values referenced above, follows:

$$f_t = \frac{d\lambda}{dt} \cdot \frac{d_{rt}}{\lambda^2} \pm \frac{2v}{\lambda} \qquad \text{Equation 2}$$

In a more general form, the direction of motion of the object 104—or more particularly, the angle θ of motion of the object 104 relative to the direction of propagation of the emitted beam—can also be considered. Equation 3, representing this more general form, follows:

$$f_t = \frac{d\lambda}{dt} \cdot \frac{d_{rt}}{\lambda^2} \pm \frac{2v}{\lambda}\cos(\theta) \qquad \text{Equation 3}$$

Using either Equation 2 or Equation 3, it may be appreciated that the distance to the object 104, represented by $$\frac{d_{rt}}{2},$$

and the velocity of that object 104 v, can be readily determined by monitoring one or more characteristics of the frequency content of the power consumed by the VCSEL light source during the up cycle and down cycle of a triangular modulation waveform. In a sawtooth modulation waveform, v can be derived from a temporal and/or spectral phase change between successive cycles. As described in reference to certain embodiments that follow, these measurements obtained from the VCSEL light source can be calibrated, adjusted, or otherwise modified in response to a similar measurement obtained from the auxiliary VCSEL light source. It is noted that $f_t$ may be sampled at a certain sampling frequency or bandwidth fs. As a result, any values of $f_t$ that are out of the [0, $f_s$] domain will be folded or reflected back to the [0, $f_s$] domain, and Equation 2 will be adjusted accordingly.

The embodiments presented herein, $d_n$ in Equation 3 may be increased with a similar or thinner optical depth t, which results in the shifting of the measured $f_t$ towards a higher radio frequency. Movement of $f_t$ away from the dominating low frequency noise floor (e.g., from low frequency drivers, laser and detector noise, and/or nonlinearity residues) enables a higher detection signal-to-noise ratio, wider spatial sensing range, and better spatial sensing accuracy, in addition to a thinner device form factor.

In many embodiments, the optical proximity sensor 110 is configured to leverage triangular waveform modulation to obtain both distance and velocity information from a VCSEL light source (or array of VCSELs), although it may be appreciated that this is merely one example and that other constructions and modulation techniques may be used.

The VCSEL light source(s) 112 may be VCSEL light sources formed onto a substrate or semiconductor die; for simplicity of illustration and description the illustrated embodiment omits many of these elements, which are described in greater detail in reference to other figures presented herein. In many cases, the VCSEL light source 112 is disposed within a protective enclosure, potting, or encapsulation (including any housing or enclosure of the electronic device 102) to prevent damage.

The VCSEL light source(s) 112 of the optical proximity sensor 110 can be formed in a pattern or array, although this may not be required. The VCSEL light source(s) 112 of the optical proximity sensor 110 can be formed from any number of suitable materials or combinations of materials. In one example embodiment, the VCSEL light source(s) 112 of the optical proximity sensor 110 each include, without limitation or express requirement: a first distributed Bragg reflector layer; an oxide layer defining an emission aperture; a multi-quantum well structure; a second distributed Bragg reflector layer; and so on. In other examples, additional or fewer layers may be required.

Any stationary or portable electronic device can incorporate an optical proximity sensor, such as described herein. Example electronic devices include, but are not limited to: mobile phone devices; tablet devices; laptop devices; desktop computers; computing accessories; peripheral input devices; home or business networking devices; aerial, marine, submarine, or terrestrial vehicle control devices or networking devices; mobile entertainment devices; augmented reality devices; virtual reality devices; industrial control devices; digital wallet devices; home or business security devices; wearable devices; head-mounted devices; hand-held controllers; health or medical devices; implantable devices; clothing-embedded devices; fashion accessory devices; home or industrial appliances; media appliances; and so on.

Similarly, the optical proximity sensor 110 can be leveraged by an electronic device for a number of suitable purposes. Example purposes include, but are not limited to: detecting distance and velocity of a user's finger (or other object, such as a stylus) to an input surface or component of the electronic device; detecting distance and velocity of a user's body (or any other object) to an input surface or component of the electronic device; detecting deflection in a surface of a housing of the electronic device due to a deformation caused by an application of force (e.g., by a user or other object, such as a stylus); and the like.

Similarly, the optical proximity sensor 110 can include any number of suitable optical path extenders, lenses, or beam-shaping elements. Examples include, but are not limited to: reflectors; mirrors; translucent lens windows; transparent lens windows; concave lenses; convex lenses; tilted lenses; microlenses; macro lenses; collimators; polarizers; color filters; infrared-cut filters; infrared-pass filters; fiber optic cables; and the like.

In many embodiments, the optical proximity sensor 110 includes a component enclosure formed from a plastic or acrylic material; other conductive or non-conductive/insulating materials including glass and metal may also be suitable. The component enclosure can be formed from a single material or, alternatively, can be formed from multiple layers or regions of different materials joined together in a suitable manner (e.g., by adhesive, welding, and the like).

The component enclosure of the optical proximity sensor 110 can be opaque or transparent, or may include transparent regions and opaque regions. The component enclosure can include one or more reflective areas or regions.

In many embodiments, the component enclosure includes a lens 114 or window disposed in an aperture defined through, or formed within, the component enclosure. Typically, the lens or window is disposed directly above, and aligned with, the VCSEL light source 112. As a result of this construction, a beam of light emitted/radiated from the VCSEL light source 112 can propagate outwardly from the component enclosure of the optical proximity sensor 110. As an additional result of this construction, one or more reflections of an emitted/radiated beam that may reflect from a surface of the object 104 can be received by the VCSEL light source 112.

In many embodiments, the optical proximity sensor 110 also includes one or more photodiodes disposed adjacent to, or integrated in, the VCSEL light source 112. In these examples, the optical proximity sensor 110 (or, more specifically, a circuit or processor of, or communicably coupled to, the optical proximity sensor 110) can monitor power output from a photodiode to determine one or more performance characteristics, such as beating frequency of that power output of the VCSEL light source 112 (see, e.g., Equations 2 and 3). It may be appreciated, however, that this foregoing example is merely one example; monitoring and/or measuring power output by and/or power consumption of a VCSEL light source may be performed in a number of suitable ways.

As with other embodiments described herein, the VCSEL light source 112 can be configured to emit a beam of laser light outwardly from the component enclosure of the optical proximity sensor 110. In the illustrated embodiment, the VCSEL light source 112 is oriented to emit/radiate light in a direction generally perpendicular to an edge of a housing of the electronic device 102. It may be appreciated, however, that this is merely one example and that other emission or radiation directions are possible or even preferred, (e.g., determining target velocity lateral to the edge of a device housing).

As with other embodiments described herein, the VCSEL light source 112 is further configured to receive a reflection of the emitted/radiated beam off the object 104. This reflection can result in self-mixing interference within the VCSEL light source 112 which, in turn, can affect power output of the VCSEL light source 112. Accordingly, monitoring power output of the VCSEL light source 112 (e.g., via monitoring an output of a photodiode, such as described above) can be used to determine and/or calculate the distance d and the velocity v of the object 104 along the optical axis of the emitting beam. (see, e.g., Equations 2 and 3).

The optical proximity sensor 110 and the electronic device 102 can be communicably or functionally coupled in any suitable manner. More specifically, the optical proximity sensor 110 can be configured to communicate distance and/or velocity information (which is calculated or otherwise determined based on self-mixing of the VCSEL light source 112), to a processor or system of the electronic device 102 in any suitable manner, according to any protocol, in compliance with any suitable digital or analog form or format.

Furthermore, as noted above, the electronic device 102 can be any suitable electronic device including both stationary and portable electronic devices. In one embodiment, the electronic device 102 is a wearable electronic device, such as a smart watch. In this example, the electronic device 102 can leverage the optical proximity sensor 110 to determine a distance to a user (represented by the object 104) and a velocity of that user while that user is interacting with the electronic device 102. For example, the electronic device 102 can leverage a signal sent from the optical proximity sensor 110 to determine whether a user is wearing the smart watch or is directing the smart watch toward the user's face.

More specifically, in some embodiments, the electronic device 102 may be configured to perform a function upon determining that the user has to cross one or more thresholds, such as distance thresholds or velocity thresholds. Such thresholds may be variable or fixed and may be set by, and/or stored within, a memory of the electronic device 102. In some examples, the thresholds may be based on a user setting, an application setting, or an operating system setting or mode of operation. In other cases, such thresholds may be based, at least in part, on a particular application executed or instantiated by a processor of the electronic device 102. For example, a threshold set associated with a telephony application may be different from a threshold set associated with a gaming application. It may be appreciated that any suitable threshold or set of thresholds, stored or accessed in any suitable form or format may be used to inform one or more behaviors of the electronic device 102 in response to a signal received from the optical proximity sensor 110.

In one specific embodiment, the electronic device 102 can disable a screen of the electronic device 102 upon determining that a user is a far distance away from the electronic device 102.

In another specific embodiment, the electronic device 102 can modify a display or power setting of the electronic device 102 based on the distance and velocity of the user.

Examples include, but may not be limited to: decreasing a brightness of a display or a display region upon receiving a signal from the optical proximity sensor 110 that the user is covering the display; increasing a brightness of a display upon receiving a signal from the optical proximity sensor 110 that the user is covering the display; highlighting a user interface element (e.g., an item of a list, a button, and the like) of a graphical user interface upon receiving a signal from the optical proximity sensor 110 that the user is hovering a finger near the display; highlighting or otherwise modifying a user interface element of a graphical user interface upon receiving a signal from the optical proximity sensor 110 that the user is hovering a finger near an input component of the electronic device 102 (e.g., rotary input device, push-button input device, touch input device, and so on); and so on.

In another embodiment, the electronic device 102 can leverage the interferometric signal received from optical proximity sensor 110 to monitor and/or authenticate users' biometric information (e.g., user heart rate pattern, blood pressure, respiration, chewing, speaking, gestures and movement, etc.). In another embodiment, the electronic device 102 can leverage the interferometric signal received from optical proximity sensor 110 to measure target properties, including, but not limited to, particular matter, particle counts, surface texture, subsurface texture, and the like.

In another embodiment, the electronic device 102 may be a portable electronic device such as a cellular phone. In these examples, the electronic device 102 can leverage a velocity or distance signal received from the optical proximity sensor 110 to determine an appropriate time to disable or enable a touch-sensitive display of the electronic device 102 when a user of the electronic device raises the cellular phone to the user's ear.

In another embodiment, the electronic device 102 may leverage a velocity or distance signal received from the optical proximity sensor 110 to determine whether the electronic device 102 is falling or will imminently impact a surface.

In another embodiment, the electronic device 102 may be a vehicle accessory or attachment. In these examples, the electronic device 102 can leverage a velocity or distance signal received from the optical proximity sensor 110 to determine a distance to, and/or a velocity of, another vehicle, pedestrian, or a road hazard.

In another embodiment, the electronic device 102 may position an optical proximity sensor, such as the optical proximity sensor 110, within an input/output communication port or a power port of the electronic device 102. In these examples, the electronic device 102 can leverage a velocity or distance signal received from the optical proximity sensor 110 to determine whether a cable is properly seated in the port, whether a cable is removed too quickly or in a manner that may cause damage to the electronic device 102, and so on.

It may be appreciated that the foregoing example embodiments are not exhaustive and that an optical proximity sensor, such as described herein, can be leveraged by an electronic device in any suitable manner to determine distance and/or velocity of a known or unknown object or surface relative to the electronic device.

For example, in some embodiments, an electronic device can include more than one optical proximity sensors, such as described herein. In another example, an electronic device can include an array of optical proximity sensors arranged in a pattern, such as in a line.

In many cases, an optical proximity sensor, such as described herein, can be disposed within a housing of an electronic device and aligned with a transparent aperture defined by the housing, but this may not be required. For example, in some embodiments, an optical proximity sensor can be disposed behind a display. In other cases, an optical proximity sensor can be disposed entirely within an electronic device housing. In these examples, the optical proximity sensor can be used to detect deflections or deformations in a surface of the electronic device that can result from a user applying a purposeful force to that surface. For example, in one embodiment, an optical proximity sensor is positioned entirely within a housing of an electronic device, behind a display. In this example, when a user of the electronic device applies a force to the display, the display may deform or bend, shortening the distance between the display and the optical proximity sensor. The optical proximity sensor, in turn, can detect and measure this deflection which can be correlated by a processor of the electronic device—and/or a processor of the optical proximity sensor—into a magnitude of force input.

Figure 2:
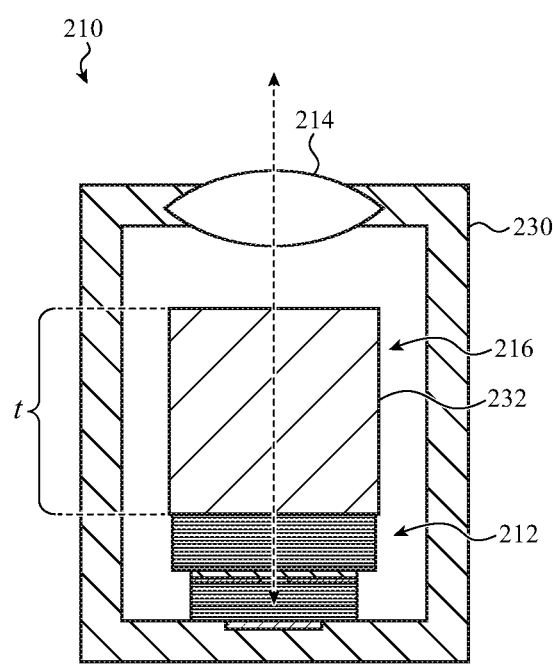
FIG. 2 illustrates an example optical proximity sensor having an optical path extender that is integrated with a VCSEL light source.

As noted herein, the optical path extenders discussed herein may extend the optical path length of an optical proximity sensor in any of a variety of ways. In some cases, the optical path extender may be a high-refractive index material. FIG. 2 illustrates an example optical proximity sensor 210 having an optical path extender 216 that is integrated with a VCSEL light source 212. The optical proximity sensor 210 may be similar to the optical proximity sensors discussed herein (e.g., optical proximity sensor 110), and may have similar structure and/or functionality, including a VCSEL light source 212, a window 214, and an enclosure 230. The optical proximity sensor 210 may include an optical path extender 216 configured to extend the optical path through the optical proximity sensor. The optical path extender 216 may be a substrate comprising a high-refractive index material. Examples of suitable high-refractive index materials include gallium arsenide, gallium nitride, glasses, polymers, chemical coatings, and the like.

In some cases the optical path extender 216 may be a substrate or another component of the VCSEL light source 212. In the embodiment shown in FIG. 2, the VCSEL light source 212 is a flip chip VCSEL, meaning that the light fires upward through a substrate 232 upon which the VCSEL chip was formed. The substrate 232 may be formed of a high-refractive index material, such as gallium arsenide, such that the substrate 232 forms at least part of the optical path extender 216.

In many traditional flip chip VCSELs, this substrate is thinned (e.g., to 0.4 mm, 0.1 mm, or less) after manufacturing to reduce a thickness of the chip. In the embodiment of FIG. 2, the substrate 232 is engineered to have minimal optical loss over thickness at VCSEL wavelengths, and is not thinned or is thinned less than traditional VCSELs. This may further extend the optical path length of the optical proximity sensor 210 by increasing a proportion of the geometric path of the optical proximity sensor in which light is traveling through the high-refractive index material of the optical path extender 216. In some cases, the substrate 232 has a thickness t between 0.25 mm and 2mm, 0.4 mm and 1 mm, 0.6 mm and 0.8 mm, or the like. The substrate 232 may have a refractive index between 1.5 and 4.5, between 3 and 4, between 3.2 and 4.8, or the like. As a result, the optical path length may be between 2.5 and 5 times the thickness of the substrate 232, between 3 and 4.5 times the thickness of the substrate 232, or the like.

As noted above, the optical path extenders discussed herein may include one or more redirection features configured to change a direction of the light traveling along the optical path of an optical proximity sensor. FIGS. 3A and 3B illustrate example optical proximity sensors 310a, 310b, which include redirection features to increase an optical path length of the optical proximity sensors. The optical proximity sensors 310a, 310b may be similar to the optical proximity sensors discussed herein (e.g., optical proximity sensors 110, 210), and may have similar structure and/or functionality, including a VCSEL light source 312, a window 314, an optical path extenders 316a, 316b, and an enclosure 330.

Turning to FIG. 3A, the optical path extender 316a may define a light path 334a extending through the optical path extender. As shown in FIG. 3A, the length of the light path 334a may be significantly longer than a thickness t of the optical path extender 316a, thereby resulting in an optical path length through the optical path extender that is greater than the thickness t. As noted above, the optical path length may be between 2.5 and 5 times the thickness t, between 3 and 4.5 times the thickness t, or the like.

As noted above, the optical path extender 316a may include redirection features to change the direction of the light path 334a one or more times as it extends through the optical path extender 316a. For example, in FIG. 3A, the light path 334a changes directions two times. The optical path extender 316a may include mirrors 340a, 340b or other suitable redirection features to change the direction of the light path. The optical path extender 316a may include additional optical features, such as optical features 342a, 342b to direct light into and out of the optical path extender 316a. The optical features 342a, 342b may include collimators, lenses, or the like. In various embodiments, the mirrors 340a, 340b need not be flat and/or parallel to each other as shown in FIG. 3A. This freedom of orientation may enable additional beam pointing and shaping functionality beyond that of the optical path extender.

The light path 334a through the optical path extender 316a changes direction twice, but in various embodiments, the light path may change directions any number of times. Turning to FIG. 3B, the optical path extender 316b may define a light path 334b through the optical path extender. Similar to the light path 334a, the length of the light path 334b may be significantly longer than a thickness t of the optical path extender 316b, thereby resulting in an optical path length through the optical path extender that is greater than the thickness t. In some cases, redirection of light through the optical path extender 316b may occur as a result of total internal reflection (or near-total internal reflection) from the surfaces of the optical path extender 316b.

In some cases, the optical path extenders 316a, 316b may additionally or alternatively include high-refractive index materials, including glasses, polymers, chemical coatings, and the like to further increase the optical path length through the optical path extenders. The redirection features and optical features of the optical path extenders 316a, 316b may include any suitable optical path extenders, lenses, or beam-shaping elements. Examples include, but are not limited to: reflectors; mirrors; translucent lens windows; transparent lens windows; concave lenses; convex lenses; tilted lenses; microlenses; macro lenses; collimators; polarizers; color filters; infrared-cut filters; infrared-pass filters; fiber optic cables; and the like. The material(s) for the optical path extenders described herein may be chosen or engineered for high throughput, low diffusing or hazing, low chromatic dispersion and/or other optical, mechanical, and/or chemical properties to favor interferometric sensing.

Figure 4A:
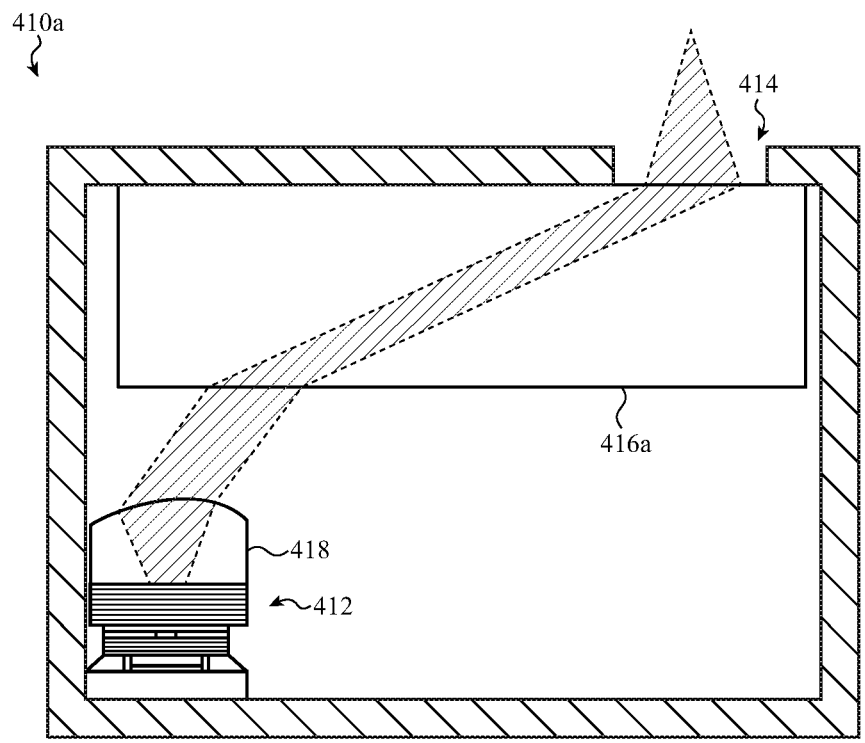
FIGS. 4A-4B illustrate example optical proximity sensors, which include photonic components to increase an optical path length of the optical proximity sensors.
Figure 4B:
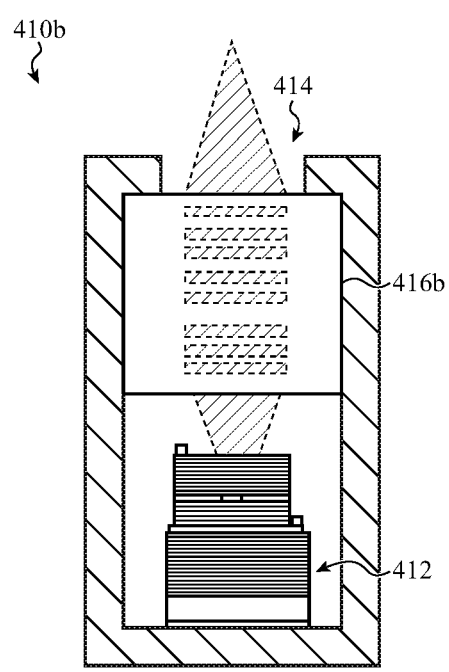

As noted above, the optical path extenders discussed herein may include a photonic component configured to simulate an extension of the geometric path within an optical proximity sensor. FIGS. 4A and 4B illustrate example optical proximity sensors 410a, 410b, which include photonic components 416a, 416b to increase an optical path length of the optical proximity sensors. The optical proximity sensors 410a, 410b may be similar to the optical proximity sensors discussed herein (e.g., optical proximity sensors 110, 210, 310a, 310b), and may have similar structure and/or functionality, including a VCSEL light source 412, a window 414, and an enclosure 430.

The photonic components 416a, 416b may be positioned between the VCSEL light source 412 and the window 414, and may be configured to apply a transfer function to light passing through the photonic component to effectively propagate light for a length that is considerably longer than the thickness of the photonic component. In some cases, each photonic component 416a, 416b applies a momentum-dependent transfer function to the light passing through it. The photonic components 416a, 416b may reproduce a Fourier transfer function that describes propagation of light through a different medium having a longer optical path length than the thickness of the photonics components. The photonic components 416a, 416b may preserve a propagation angle of the light such that rays exiting the photonic components 416a, 416b are parallel to their corresponding incoming rays.

In various embodiments, the photonic components 416a, 416b may be implemented in a variety of ways. In some cases, as shown in FIG. 4A, the photonic component 416a may be a plane-parallel plate with a refractive index less than or equal to the refractive index of a background medium. In some cases, the photonic component 416a includes a uniaxial photonic crystal slab, such as a calcite crystal, with its axis oriented perpendicular to its entrance and exit faces. In some cases, as shown in FIG. 4B, the photonic component 416b is a metamaterial having multiple layers having different thicknesses. The metamaterial may include alternating layers formed from silicon and silicon dioxide.

Figure 5A:
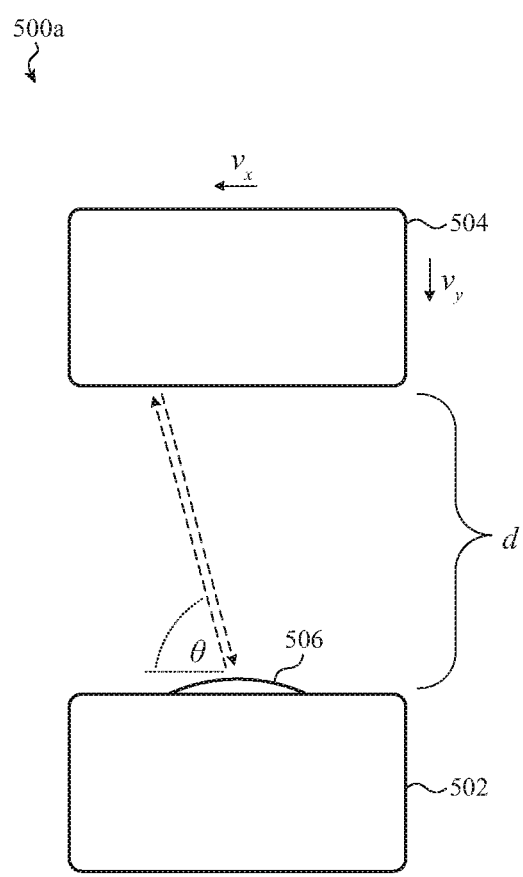
FIG. 5A depicts a schematic representation of another electronic device incorporating a proximity sensor, such as described herein, to determine a distance to, and/or a velocity of, an object near the electronic device.

The foregoing examples are not exhaustive; it may be appreciated that generally and broadly an electronic device can leverage one or more optical proximity sensors, such as described herein, for any suitable purpose or function. For example, FIG. 5A depicts a schematic representation 500a of an electronic device 502 configured to measure a distance d to an object 504 and/or a velocity of the object 504 relative to an optical proximity sensor 510, such as described herein. In this example embodiment, the optical proximity sensor 510 can include a beam-shaping lens that redirects light emitted from the optical proximity sensor 510 to an angle θ. In this manner and as a result of this construction, the electronic device 502 and the optical proximity sensor 510 can determine velocity in multiple directions or along multiple axes (e.g., $v_x$ and $v_y$). In this manner, together (optionally) with one or more additional optical proximity sensors, the electronic device 502 can determine multi-axis velocity and distance.

Figure 5B:
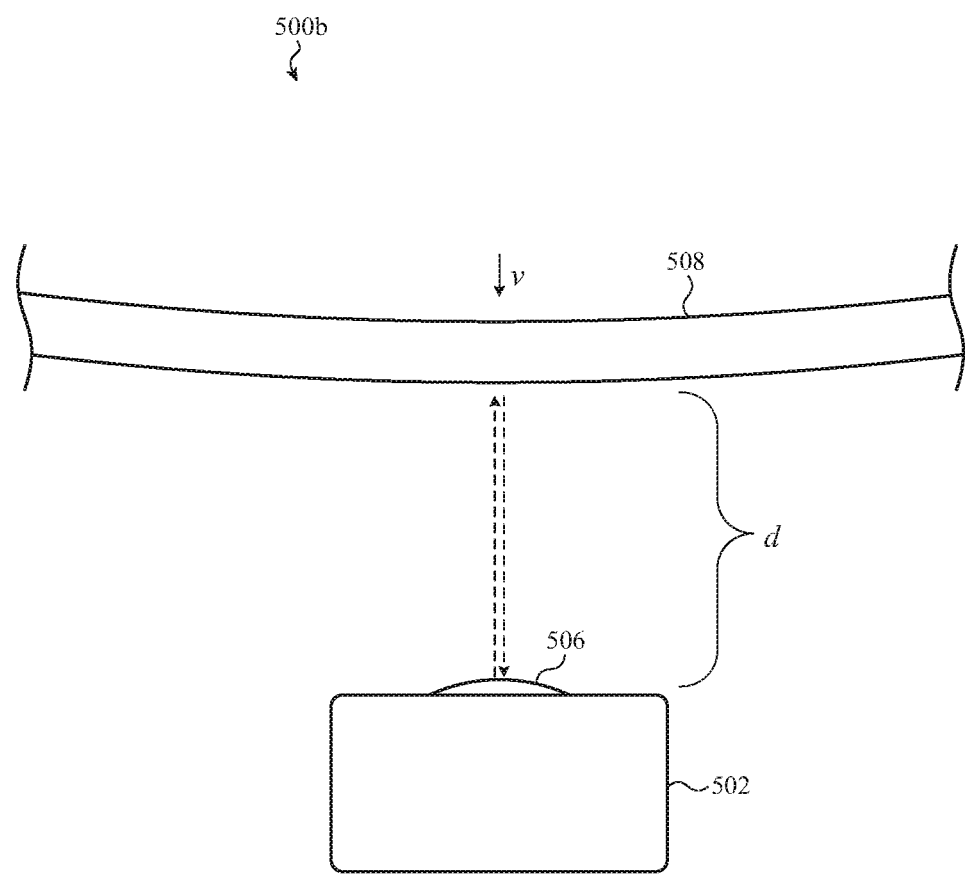
FIG. 5B depicts a schematic representation of another electronic device incorporating a proximity sensor, such as described herein, to determine a distance to, and/or a velocity of, a movable surface of the electronic device.

Still other embodiments can be implemented in other manners. For example, FIG. 5B depicts a schematic representation 500b of an electronic device 502 configured to leverage an optical proximity sensor 510 to measure a distance d to a flexible surface 508 and a velocity v of one or more deformations or flexions of that flexible surface 508.

In this manner, and as a result of this construction, flexion of the flexible surface 508 can be quantified by the electronic device 502.

Expanding upon these and related examples, FIGS. 6A-6D are presented to depict various example use cases for an optical proximity sensor, such as described herein. These figures depict a wearable electronic device, such as a smart watch, but it may be appreciated that this is merely one example. An optical proximity sensor, such as described herein, can be incorporated into any suitable electronic device and leveraged for any suitable purpose.

Figure 6A:
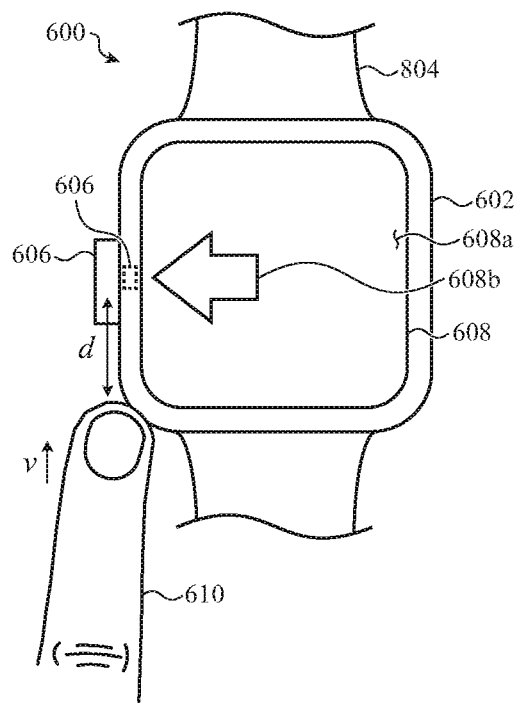
FIG. 6A depicts a schematic representation of an electronic device incorporating a proximity sensor, such as described herein, to determine a distance to, and/or a velocity of, a user's finger relative to an input region of the electronic device.

For example, FIG. 6A depicts a wearable electronic device 600 including a housing 602 that can be worn by a user (e.g., via a wristband 604). In this example, an optical proximity sensor 606 can be included within the housing 602 and positioned relative to a periphery or bezel region of a display 608 that defines a graphical user interface 608a with which a user can interact. As a result of this construction, the optical proximity sensor 606 can be configured to and oriented to detect, measure, or otherwise determine a distance d and/or a velocity v of a user's finger 610 relative to an input component 612. The input component 612 can be any suitable input component including, but not limited to: a rotating input component (e.g., a crown); a press-button input component; a solid-state input component; and so on.

In this example embodiment, the wearable electronic device 600 can be configured to perform a first function upon determining that the user's finger 610 is approaching the input component 612, to perform a second function upon determining that the user's finger 610 is departing or moving away from the input component 612, to perform a third function upon determining that the user's finger 610 is hovering near or on the input component 612, and so on. It may be appreciated that these examples are not exhaustive and that the wearable electronic device 600 can perform any suitable function or operation based on the distance d and/or the velocity v of the user's finger 610 relative to the input component 612 as determined by the optical proximity sensor.

For example, in one embodiment, the wearable electronic device 600 can modify a position, characteristic, size, color, or other quality of a graphical user interface element 608b in response to a change in the distance d between the input component 612 and the user's finger 610.

Figure 6B:
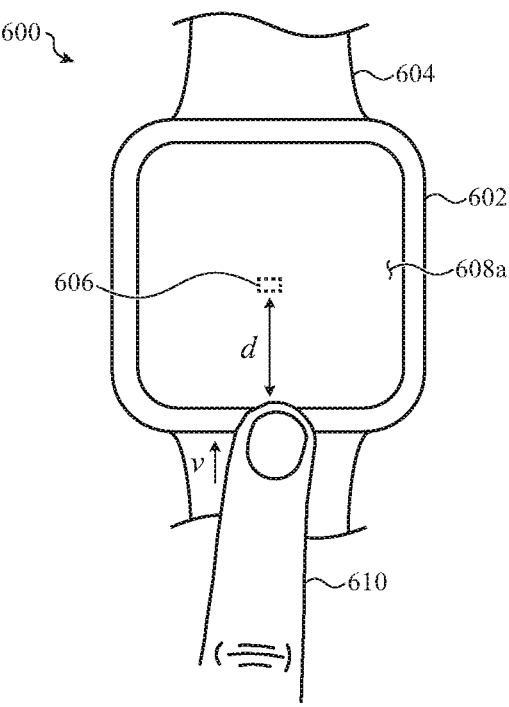
FIG. 6B depicts a schematic representation of an electronic device incorporating a proximity sensor, such as described herein, to determine a distance to, and/or a velocity of, a user's finger relative to a touch-input region of the electronic device.

In another example, FIG. 6B depicts a wearable electronic device 600 including a housing 602 configured to couple to a user via a wristband 604. An optical proximity sensor 606, such as described herein, can be disposed behind a display 608 that renders a graphical user interface 608a. In one example, the optical proximity sensor 606 is configured to emit light through an inter-pixel region of the display 608.

In this example, the optical proximity sensor 606 can be configured and oriented to detect, measure, or otherwise determine a distance d and/or a velocity v of a user's finger 610 relative to the display 608 and/or to the graphical user interface 608a. The display 608 can be implemented as or with, without limitation: a touch-sensitive screen or display; a force-sensitive screen or display; a haptic-output surface; and so on.

In this example embodiment, as with other embodiments described herein, the wearable electronic device 600 can be configured to perform any suitable function or operation based on the distance d and/or the velocity v—and/or changes therein over time—of the user's finger 610 relative to the display 608 as determined by the optical proximity sensor.

Figure 6C:
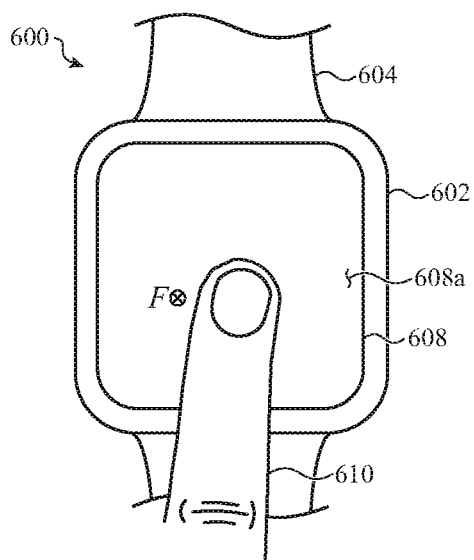
FIG. 6C depicts a schematic representation of an electronic device incorporating a proximity sensor, such as described herein, to determine a distance to, and/or a velocity of, a movable surface of the electronic device against which a user of the electronic device can exert a force.

In another example, FIG. 6C depicts a wearable electronic device 600 including a housing 602 that can be attached to a user via a wristband 604. An optical proximity sensor, such as described herein, can be disposed within the housing 602. In this example, the optical proximity sensor can be configured to and oriented to detect, measure, or otherwise determine a distance d and/or a velocity v of a deflection of a display 608 that results from a downward force applied by the user's finger 610 to a graphical user interface 608a rendered by the display 608. The display 608 can be configured in the same manner as described in reference to FIG. 6B, and this description is not repeated.

In this example embodiment, as with other embodiments described herein, the wearable electronic device 600 can be configured to perform any suitable function or operation based on the distance d and/or the velocity v—and/or changes therein over time—of the user's finger 610 relative to the display 608 as determined by the optical proximity sensor. In many examples, the wearable electronic device 600 can be configured to correlate or otherwise convert at least one of a distance d and/or a velocity v of the deflection of an display 608 into a magnitude of force input F.

Figure 6D:
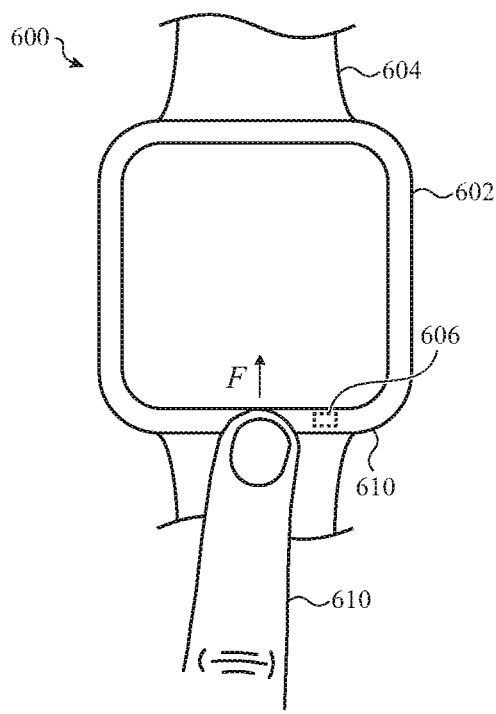
FIG. 6D depicts another schematic representation of an electronic device incorporating a proximity sensor, such as described herein, to determine a distance to, and/or a velocity of, a movable surface of the electronic device against which a user of the electronic device can exert a force.

In yet another example, FIG. 6D depicts a wearable electronic device 600 including a housing 602 that can be attached to a user via a wristband 604. An optical proximity sensor 606, such as described herein, can be disposed within the housing 602 adjacent to a sidewall of the housing 602. More specifically, in this example, the optical proximity sensor 606 can be configured to and oriented to detect, measure, or otherwise determine a distance d and/or a velocity v of a deflection of a housing sidewall or housing section that results from a force F applied by the user.

In this example embodiment, as with other embodiments described herein, the wearable electronic device 600 can be configured to perform any suitable function or operation based on the determine magnitude of the force F—and/or changes therein over time—applied by the user's finger 610 as determined by the optical proximity sensor.

The foregoing embodiments depicted in FIGS. 1-6B and the various alternatives thereof and variations thereto are presented, generally, for purposes of explanation, and to facilitate an understanding of various possible constructions of an optical proximity sensor, such as described herein. However, it will be apparent to one skilled in the art that some of the specific details presented herein may not be required in order to practice a particular described embodiment, or an equivalent thereof.

Figure 7:
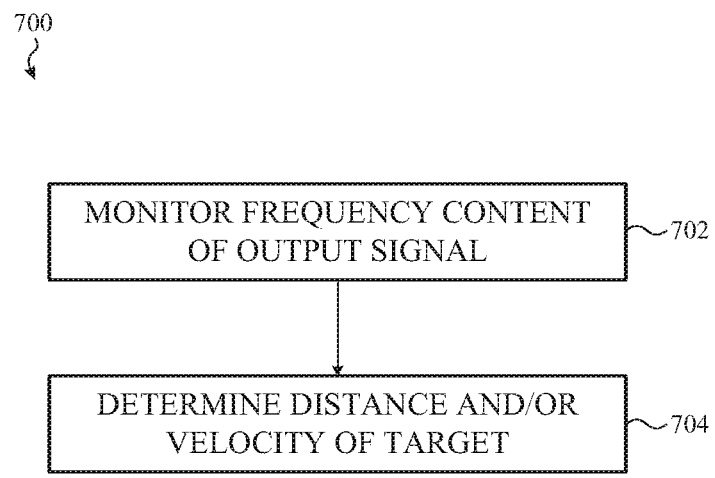
FIG. 7 is a flowchart depicting example operations of a method of operating a proximity sensor, such as described herein.

FIG. 7 is a flowchart depicting example operations of a method 700 for operating a proximity sensor, such as described herein. The method 700 includes operation 702 in which frequency content of an output signal (e.g., of a photodiode optically coupled to a VCSEL such as described herein) is monitored. Next, at operation 704, distance and/or velocity information can be determined based on the monitored frequency content of operation 702.

Figure 8:
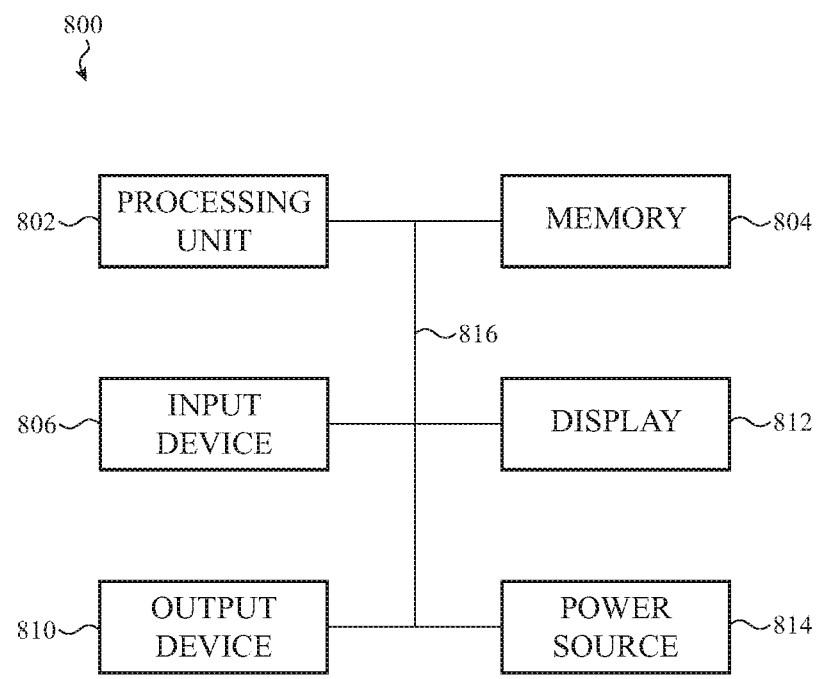
FIG. 8 illustrates a sample electrical block diagram of an electronic device that may perform the operations described herein.

FIG. 8 illustrates a sample electrical block diagram of an electronic device 800 that may perform the operations described herein. The electronic device 800 may in some cases take the form of any of the electronic devices described with reference to FIGS. 1-7, including electronic devices 102, 502, and 602 and/or optical proximity sensors 110, 210, 310, 410, 510, and 610. The electronic device 800 can include one or more of a display 812, a processing unit 802, a power source 814, a memory 804 or storage device, input devices 806, and output devices 810. In some cases, various implementations of the electronic device 800 may lack some or all of these components and/or include additional or alternative components.

The processing unit 802 can control some or all of the operations of the electronic device 800. The processing unit 802 can communicate, either directly or indirectly, with some or all of the components of the electronic device 800. For example, a system bus or other communication mechanism 816 can provide communication between the processing unit 802, the power source 814, the memory 804, the input device(s) 806, and the output device(s) 810.

The processing unit 802 can be implemented as any electronic device capable of processing, receiving, or transmitting data or instructions. For example, the processing unit 802 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 800 can be controlled by multiple processing units. For example, select components of the electronic device 800 (e.g., an input device 806) may be controlled by a first processing unit and other components of the electronic device 800 (e.g., the display 812) may be controlled by a second processing unit, where the first and second processing units may or may not be in communication with each other.

The power source 814 can be implemented with any device capable of providing energy to the electronic device 800. For example, the power source 814 may be one or more batteries or rechargeable batteries. Additionally or alternatively, the power source 814 can be a power connector or power cord that connects the electronic device 800 to another power source, such as a wall outlet.

The memory 804 can store electronic data that can be used by the electronic device 800. For example, the memory 804 can store electronic data or content such as, for example, audio and video files, documents and applications, device settings and user preferences, timing signals, control signals, and data structures or databases. The memory 804 can be configured as any type of memory. By way of example only, the memory 804 can be implemented as random access memory, read-only memory, Flash memory, removable memory, other types of storage elements, or combinations of such devices.

In various embodiments, the display 812 provides a graphical output, for example associated with an operating system, user interface, and/or applications of the electronic device 800 (e.g., a chat user interface, an issue-tracking user interface, an issue-discovery user interface, etc.). In one embodiment, the display 812 includes one or more sensors and is configured as a touch-sensitive (e.g., single-touch, multi-touch) and/or force-sensitive display to receive inputs from a user. For example, the display 812 may be integrated with a touch sensor (e.g., a capacitive touch sensor) and/or a force sensor to provide a touch- and/or force-sensitive display. The display 812 is operably coupled to the processing unit 802 of the electronic device 800.

The display 812 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 812 is positioned beneath and viewable through a cover that forms at least a portion of an enclosure of the electronic device 800.

In various embodiments, the input devices 806 may include any suitable components for detecting inputs. Examples of input devices 806 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 806 may be configured to detect one or more particular types of input and provide a signal (e.g., an input signal) corresponding to the detected input. The signal may be provided, for example, to the processing unit 802.

As discussed above, in some cases, the input device(s) 806 include a touch sensor (e.g., a capacitive touch sensor) integrated with the display 812 to provide a touch-sensitive display. Similarly, in some cases, the input device(s) 806 include a force sensor (e.g., a capacitive force sensor) integrated with the display 812 to provide a force-sensitive display.

The output devices 810 may include any suitable components for providing outputs. Examples of output devices 810 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 810 may be configured to receive one or more signals (e.g., an output signal provided by the processing unit 802) and provide an output corresponding to the signal.

In some cases, input devices 806 and output devices 810 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 802 may be operably coupled to the input devices 806 and the output devices 810. The processing unit 802 may be adapted to exchange signals with the input devices 806 and the output devices 810. For example, the processing unit 802 may receive an input signal from an input device 806 that corresponds to an input detected by the input device 806. The processing unit 802 may interpret the received input signal to determine whether to provide and/or change one or more outputs in response to the input signal. The processing unit 802 may then send an output signal to one or more of the output devices 810, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
   a housing defining an aperture;
   a self-mixing proximity sensor positioned at least partially within the housing, the self-mixing proximity sensor comprising:
      a flip chip vertical cavity surface-emitting laser (VCSEL) light source formed on a gallium arsenide substrate and configured to emit a beam of light through the gallium arsenide substrate and the aperture;
      an optical path extender including the gallium arsenide substrate and having a thickness that extends between the flip chip VCSEL light source and the aperture, the optical path extender having an optical path length that is at least three times the thickness; and
   a processor positioned within the housing and operably coupled to the self-mixing proximity sensor, the processor configured to determine a distance to a target using an output signal of the self-mixing proximity sensor.

2. The electronic device of claim 1, wherein:
   the self-mixing proximity sensor further comprises:
      a lens positioned in the aperture and configured to direct the beam of light toward the target; and
      a power controller configured to monitor a power output of the VCSEL light source for self-mixing interference effects; and
   the optical path extender is positioned between the VCSEL light source and the lens.

3. The electronic device of claim 1, wherein:
   the optical path length is between 3.5 and 4.5 mm; and
   the thickness of the optical path extender is between 0.8 and 1.5 mm.

4. The electronic device of claim 1, wherein:
   the gallium arsenide substrate has a substrate thickness between 0.4 and 1 mm; and
   the gallium arsenide substrate has a refractive index between 3 and 4.

5. The electronic device of claim 1, wherein the optical path extender comprises one or more redirection features configured to change a direction of the beam of light as it passes through the optical path extender.

6. The electronic device of claim 1, wherein the optical path extender comprises a photonic component configured to apply a momentum-dependent transfer function to the beam of light.

7. An optical proximity sensor for an electronic device, comprising:
   an enclosure;
   a vertical cavity surface-emitting laser (VCSEL) light source positioned within the enclosure and configured to emit a coherent beam of light toward an object;
   a photodiode optically coupled to the VCSEL light source;
   an optical path extender positioned between the VCSEL light source and the object, the optical path extender including a photonic component configured to apply a momentum-dependent transfer function to the coherent beam of light; and
   a power controller configured to:
      monitor a power output of the photodiode; and
      determine a property of the object reflecting the beam of light based, at least in part, on the power output of the photodiode.

8. The optical proximity sensor of claim 7, wherein the photonic component comprises a metamaterial comprising alternating layers of silicon and silicon dioxide.

9. The optical proximity sensor of claim 7, wherein the property is one of distance, velocity, or acceleration.

10. The optical proximity sensor of claim 7, wherein determining the property of the object comprises determining a property of an interior surface of the enclosure.

11. The optical proximity sensor of claim 7, wherein:
    the enclosure defines an aperture; and
    the VCSEL light source is aligned with the aperture such that the coherent beam passes through the aperture.

12. The optical proximity sensor of claim 11, wherein the optical proximity sensor further comprises a lens disposed within the aperture.

13. The optical proximity sensor of claim 7, wherein the power controller is configured to drive the VCSEL light source with a triangular current waveform.

14. An electronic watch comprising:
    a housing defining an aperture;
    a display positioned at least partially within the housing and configured to provide a graphical output;
    a rotatable crown configured to receive a rotational input; and
    an optical proximity sensor positioned at least partially within the housing, the optical proximity sensor comprising:
       a vertical cavity surface-emitting laser (VCSEL) light source configured to emit a beam of light through the aperture; and
       an optical path extender positioned in a light path of the VCSEL light source, the optical path extender including at least one of,
          a substrate on which the VCSEL is formed and through which the VCSEL emits the beam of light; or
          a photonic component configured to apply a momentum-dependent transfer function to the beam of light; and
    a processor positioned within the housing and operably coupled to the optical proximity sensor, the processor configured to modify the graphical output based on an output signal of the optical proximity sensor.

15. The electronic watch of claim 14, wherein the optical path extender comprises the substrate and the substrate has a refractive index between 3 and 4.

16. The electronic watch of claim 14, wherein the processor is configured to:
   determine a change to a distance between an object and the rotatable crown using the output signal of the optical proximity sensor; and
   modify the graphical output based on the change to the distance.

17. The electronic watch of claim 14, wherein:
   the display is a touch-sensitive screen; and
   the optical proximity sensor is configured to emit the beam of light through the touch-sensitive screen.

18. The electronic watch of claim 17, wherein the processor is configured to:
   determine a position of an object relative to the touch-sensitive screen using the output signal of the optical proximity sensor; and
   modify the graphical output based on the position of the object.

19. The electronic watch of claim 17, wherein the processor is configured to:
   determine a force applied to the touch-sensitive screen using the output signal of the optical proximity sensor; and
   modify the graphical output based on the force.

* * * * *